(12) United States Patent
Schneider et al.

(10) Patent No.: US 10,001,396 B2
(45) Date of Patent: Jun. 19, 2018

(54) PRESSURE-SENSOR APPARATUS, AIR-MASS MEASURING APPARATUS, AIR-MASS MEASURING SYSTEM AND PRESSURE-MEASURING METHOD

(71) Applicant: Robert Bosch GmbH, Stuttgart (DE)

(72) Inventors: Norbert Schneider, Tiefenbronn (DE); Michael Horstbrink, Stuttgart (DE); Michael Rittmann, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 91 days.

(21) Appl. No.: 15/104,294

(22) PCT Filed: Nov. 4, 2014

(86) PCT No.: PCT/EP2014/073693
§ 371 (c)(1),
(2) Date: Jun. 14, 2016

(87) PCT Pub. No.: WO2015/090712
PCT Pub. Date: Jun. 25, 2015

(65) Prior Publication Data
US 2016/0313164 A1 Oct. 27, 2016

(30) Foreign Application Priority Data
Dec. 17, 2013 (DE) .......... 10 2013 226 138

(51) Int. Cl.
*G01M 15/04* (2006.01)
*G01F 15/18* (2006.01)
(Continued)

(52) U.S. Cl.
CPC ............ *G01F 15/18* (2013.01); *G01F 1/34* (2013.01); *G01L 15/00* (2013.01); *G01L 19/0092* (2013.01)

(58) Field of Classification Search
USPC ............................. 73/114.33, 114.37
See application file for complete search history.

(56) References Cited

U.S. PATENT DOCUMENTS 4,895,026 A * 1/1990 Tada .................. G01L 9/06
338/4
6,123,397 A * 9/2000 Ohtomo ............ B60T 8/4072
303/116.1
(Continued)

FOREIGN PATENT DOCUMENTS

DE 102004040924 3/2006
DE 102012215235 A1 5/2013
(Continued)

OTHER PUBLICATIONS

International Search Report dated Feb. 9, 2015, of the corresponding International Application PCT/EP2014/073693, filed on Nov. 4, 2014.

*Primary Examiner* — Eric S McCall
(74) *Attorney, Agent, or Firm* — Norton Rose Fulbright US LLP; Gerard Messina (57) ABSTRACT

A pressure-sensor apparatus for an air-mass measuring apparatus for a vehicle. The pressure-sensor apparatus has a circuit carrier, a first pressure sensor which is disposed on the circuit carrier and is designed to sense a pressure and to provide a first pressure signal representing the pressure, a second pressure sensor which is disposed on the circuit carrier and is designed to sense the pressure and to provide a second pressure signal representing the pressure, and an evaluator which is disposed on the circuit carrier and has a first input interface to receive the first pressure signal, a second input interface to receive the second pressure signal and an output interface to output an output signal provided using the first pressure signal and the second pressure signal.

10 Claims, 3 Drawing Sheets

(51) Int. Cl.
*G01L 15/00* (2006.01)
*G01F 1/34* (2006.01)
*G01L 19/00* (2006.01)

(56) References Cited

U.S. PATENT DOCUMENTS

| | | | |
|---|---|---|---|
| 7,133,765 B2 * | 11/2006 | Beyer | F02D 41/222 |
| | | | 701/114 |
| 2004/0250610 A1 | 12/2004 | Dempsey et al. | |
| 2008/0206108 A1 * | 8/2008 | Anilkumar | G01N 27/4065 |
| | | | 422/94 |
| 2010/0299087 A1 * | 11/2010 | Menold | F02D 41/222 |
| | | | 702/47 |
| 2012/0312001 A1 * | 12/2012 | Nam | F02D 41/0072 |
| | | | 60/299 |
| 2013/0269419 A1 * | 10/2013 | Etherington | G01F 1/692 |
| | | | 73/37 |
| 2013/0283895 A1 * | 10/2013 | Etherington | G01F 1/6842 |
| | | | 73/114.34 |
| 2013/0343911 A1 * | 12/2013 | Stephens | F04B 49/00 |
| | | | 417/44.1 |
| 2016/0139097 A1 * | 5/2016 | Skarping | G01N 1/24 |
| | | | 73/1.06 |
| 2016/0221561 A1 * | 8/2016 | Leroy | B60T 13/72 |
| 2017/0067578 A1 * | 3/2017 | Hoffman | F01D 21/003 |

FOREIGN PATENT DOCUMENTS

| | | | |
|---|---|---|---|
| EP | 2657669 A2 | 10/2013 | |
| WO | 0166957 A2 | 9/2001 | |
| WO | WO 2007/031516 | 3/2007 | |

* cited by examiner

PRESSURE-SENSOR APPARATUS, AIR-MASS MEASURING APPARATUS, AIR-MASS MEASURING SYSTEM AND PRESSURE-MEASURING METHOD

BACKGROUND INFORMATION

The present invention relates to a pressure-sensor apparatus for an air-mass measuring apparatus for a vehicle, an air-mass measuring apparatus, an air-mass measuring system, as well as a pressure-measuring method for a vehicle.

The measuring of air mass is established in the case of gasoline engines and diesel engines. It is used to regulate the fuel-injection quantity and the exhaust-gas recirculation.

SUMMARY

Against this background, the present invention introduces a pressure-sensor apparatus for an air-mass measuring apparatus for a vehicle, an air-mass measuring apparatus, an air-mass measuring system as well as a pressure-measuring method for a vehicle. Advantageous refinements are described below.

A pressure may be sensed very reliably using two separate sensors. By linking the sensors via separate interfaces to an evaluator, very high failure safety of the overall system may be ensured.

A pressure-sensor apparatus for an air-mass measuring apparatus for a vehicle has the following features:
 a circuit carrier;
 a first pressure sensor which is disposed on the circuit carrier and is designed to sense a pressure and to provide a first pressure signal representing the pressure;
 a second pressure sensor which is disposed on the circuit carrier and is designed to sense a pressure and to provide a second pressure signal representing the pressure; and
 an evaluator which is disposed on the circuit carrier and has a first input interface to receive the first pressure signal, a second input interface to receive the second pressure signal and an output interface to output an output signal provided using the first pressure signal and the second pressure signal.

For example, an air-mass measuring apparatus may be used to ascertain an air mass supplied to a combustion engine of a vehicle. The air-mass measuring apparatus may be implemented, for instance, as what is referred to as an integrated pressure- and humidity sensor. Correspondingly, a pressure-sensor apparatus may be used to ascertain a pressure of the air. The two pressure sensors may be situated in such a way that they are exposed to the same ambient pressure. Thus, the pressure signals of the two pressure sensors may be regarded as redundant signals. A pressure signal may be an electrical signal that may include data reflecting a detected pressure. For example, data provided by the evaluator at the output interface may be received by a control unit of the vehicle and further processed. The circuit carrier, e.g., in the form of a printed circuit board, may be formed to be placed in an electronics chamber of a housing. The pressure sensors may each include a signal-conditioning device for conditioning acquired sensor values and may be designed to transmit the pressure signals as conditioned data to the evaluator. The evaluator may be designed to combine the pressures signals, received via the reception interfaces, according to a communications protocol of the output interface to form the output signal.

Each of the input interfaces for receiving the pressure signals may be implemented as an interface of a separate data bus. For example, such a data bus may be a serial data bus. By transmitting via data buses decoupled from each other, it is possible to ensure that in the event one data bus fails, only the pressure signal to be transmitted via this data bus gets lost; however, the further pressure signal may be transmitted via the further data bus. Failure safety is thereby increased.

According to one specific embodiment, the evaluator may include a first evaluation circuit which has the first input interface to receive the first pressure signal and an output interface to output a third pressure signal provided using the first pressure signal. The evaluator may also include a second evaluation circuit which has the second input interface to receive the second pressure signal, a third input interface to receive the third pressure signal and the output interface to output the output signal provided using the second pressure signal and the third pressure signal.

For instance, the first evaluation circuit may be realized as an integrated evaluation circuit, and the second evaluation circuit as an integrated microcontroller circuit. Thus, it is possible to draw on components already used in connection with air-mass measuring apparatuses.

The first evaluation circuit and the second evaluation circuit may be placed on opposite sides of the circuit carrier. In this manner, the size of the circuit carrier may be kept small.

According to one specific embodiment, the first evaluation circuit may have a fourth input interface to receive an air-mass signal provided by an air-mass sensor. In this way, the evaluation circuit may be used for several evaluation tasks.

An air-mass measuring apparatus for a vehicle has the following features:
 an air-mass sensor for providing an air-mass signal; and
 an above-mentioned pressure-sensor apparatus, the evaluator of the pressure-sensor apparatus having an input interface to receive the air-mass signal.

Thus, the pressure-sensor apparatus indicated may be realized advantageously as part of an air-mass measuring apparatus.

Even if air is discussed in the specific embodiments and exemplary embodiments in connection with the air-mass measuring apparatus, instead of air, the mass of any gas or gas mixture may be measured. The practical application in the vehicle sector is also only selected by way of example.

Such an air-mass measuring apparatus may have a humidity sensor and, additionally or alternatively, a temperature sensor. The evaluator may be designed to receive a humidity signal from the humidity sensor and, additionally or alternatively, a temperature signal from the temperature sensor. In this manner, a range of application for the air-mass measuring apparatus may be increased.

The air-mass measuring apparatus may have a sensor carrier on which the air-mass sensor is disposed. The air-mass measuring apparatus may also have a base element for accommodating the sensor carrier and the circuit carrier, as well as a housing. The housing may have an electronics chamber, a measuring channel for conducting a gas and an electrical connection. In this context, a unit made up of the base element, the sensor carrier and the circuit carrier may be disposed in the electronics chamber, the air-mass sensor may be inserted into the measuring channel, and the output interface may be connected to the electrical connection via electric lines. Thus, the entire electronics may be realized as one unit, which may be received and retained by the housing. For example, the electrical connection of the air-mass measuring apparatus may take the form of a plug connector. The housing may be implemented as a plug-insensor housing, for instance. The gas, e.g., air, whose mass is to be determined, may be conducted through the measuring channel. In this way, the air-mass measuring apparatus may represent a compact unit.

An air-mass measuring system for a vehicle, which is disposed or is able to be disposed in an induction tract of a combustion engine of the vehicle, may have an above-mentioned air-mass measuring apparatus. In this context, the air-mass measuring apparatus may be connected or connectable via the electrical connection to a control unit of the vehicle. Thus, the air-mass measuring apparatus indicated is suited advantageously for use in a motor vehicle, e.g., an automobile or a truck.

A pressure-measuring method for an air-mass measuring apparatus for a vehicle includes the following steps:

provision of a first pressure signal, which represents a pressure sensed by a first pressure sensor disposed on a circuit carrier;

provision of a second pressure signal, which represents a pressure sensed by a second pressure sensor disposed on the circuit carrier;

reception of the first pressure signal via a first input interface of an evaluator disposed on the circuit carrier;

reception of the second pressure signal via a second input interface of the evaluator; and output of an output signal, provided using the first pressure signal and the second pressure signal, at an output interface of the evaluator.

The above-mentioned steps may be implemented advantageously using devices of the pressure-sensor apparatus indicated or of the air-mass measuring apparatus indicated.

BRIEF DESCRIPTION OF THE DRAWINGS

Below, the present invention is explained in detail by way of example with reference to the figures.

DETAILED DESCRIPTION OF EXAMPLE EMBODIMENTS

In the following description of preferred exemplary embodiments of the present invention, the same or similar reference symbols are used for the similarly functioning elements shown in the various figures, a repeated description of these elements being omitted.

Figure 1:
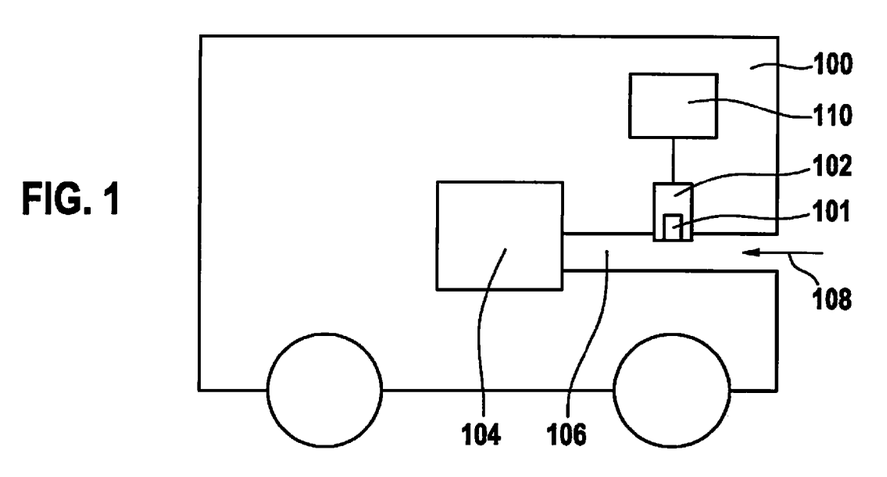
FIG. 1 shows a schematic representation of a vehicle having a pressure-sensor apparatus.

FIG. 1 shows a schematic representation of a vehicle 100 having a pressure-sensor apparatus 101 according to one exemplary embodiment of the present invention. Vehicle 100 has a combustion engine 104, to which air 108 is supplied via an air duct 106. Pressure-sensor apparatus 101 is disposed in or on air duct 106, and is designed to detect a pressure of air 108 and, according to this exemplary embodiment, to make it available to a control unit 110 of vehicle 100.

According to different exemplary embodiments, pressure-sensor apparatus 101 may also be designed to acquire values representing a temperature, an air mass and/or a humidity of air 108 and to make them available, for example, to control unit 110.

According to one exemplary embodiment, pressure-sensor apparatus 101 is part of an air-mass measuring apparatus 102. Air-mass measuring apparatus 102 is designed to detect a mass of air 108 or a value representing the mass. To that end, air-mass measuring apparatus 102 may be designed to measure a mass of a portion of air 108 flowing through a measuring channel of air-mass measuring apparatus 102.

Figure 2:
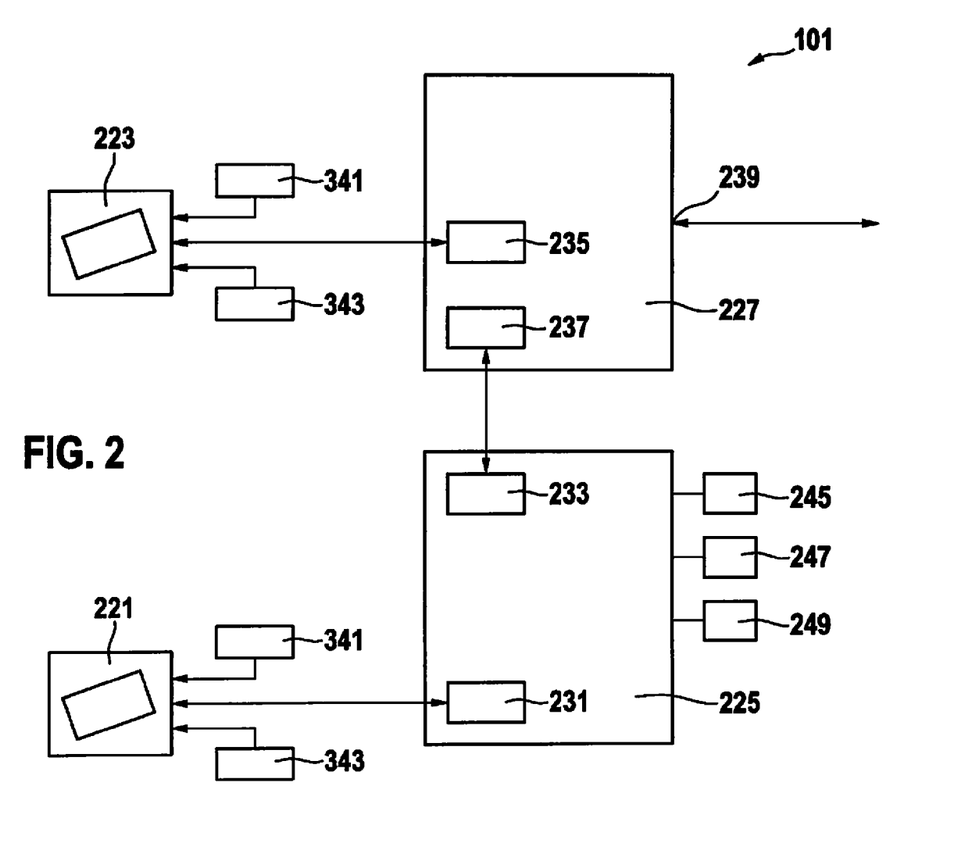
FIG. 2 shows a representation of a pressure-sensor apparatus.

FIG. 2 shows a schematic representation of a pressure-sensor apparatus 101 according to one exemplary embodiment of the present invention. It may be pressure-sensor apparatus 101 indicated in FIG. 1. Pressure-sensor apparatus 101 has a first pressure sensor 221, a second pressure sensor 223 and an evaluator. According to this exemplary embodiment, the evaluator has a first evaluation circuit 225 and a second evaluation circuit 227.

First evaluation circuit 225 has an input interface 231 and an output interface 233. First pressure sensor 221 is connected to first evaluation circuit 225 via input interface 231. According to this exemplary embodiment, input interface 231 is realized as a bidirectional interface. First evaluation circuit 225 is designed to receive a first pressure signal via input interface 231. The first pressure signal includes pressure data acquired by first pressure sensor 221. First evaluation circuit 225 is designed to output either the first pressure signal or a pressure signal based on data of the first pressure signal via output interface 233 to second evaluation circuit 227.

Second evaluation circuit 227 has an input interface 235, a further input interface 237 and an output interface 239. Second pressure sensor 223 is connected to second evaluation circuit 227 via input interface 235. According to this exemplary embodiment, input interface 235 is realized as a bidirectional interface. Second evaluation circuit 227 is designed to receive a second pressure signal via input interface 235. The second pressure signal includes pressure data acquired by second pressure sensor 223. Second evaluation circuit 227 is designed to receive the signal, which is output by first evaluation circuit 225 via output interface 233 and includes pressure data acquired by first pressure signal 221, via further input interface 237. Second evaluation circuit 225 is also designed to output either the signals received via input interfaces 235, 237 or an output signal ascertained from them, via output interface 239, e.g., to a control unit, as shown in FIG. 1. According to this exemplary embodiment, output interface 239 is realized as a bidirectional interface.

Pressure sensors 221, 223 each have a connection for connecting pressure sensors 221, 223 to an operating voltage Vsupply 341.

In addition, each pressure sensor 221, 223 has a connection for connecting pressure sensors 221, 223 to a ground potential GND 343.

Pressure sensors 221, 223 and evaluation circuits 225, 227 may be disposed on one common circuit carrier.

Interfaces 231, 233, 235 may each be assigned to a separate data bus. Therefore, three independent data buses may be used to connect pressure sensors 221, 223 to evaluation circuits 225, 227, and to connect evaluation circuits 225, 227 to each other.

Interfaces 231, 233, 235, 237, 239 may be realized as digital interfaces.

According to one alternative specific embodiment, the evaluator may also be implemented in one piece and have input interface 231 to receive the first pressure signal, input interface 235 to receive the second pressure signal and output interface 239 to output an output signal based on data of the first pressure signal and of the second pressure signal.

According to one exemplary embodiment, as an option, the evaluator has at least one further interface to receive an air-mass signal provided by an air-mass sensor 245, a temperature signal provided by a temperature sensor 247 and/or a humidity signal provided by a humidity sensor 249. Humidity sensor 249 may include a semi-permeable membrane having a "measuring chamber" humidity sensor and a humidity sensor.

For example, first evaluation circuit 225 may have these corresponding interfaces. Accordingly, received data may be transmitted via output interface 233 or one or more further output interfaces to second evaluation circuit 227.

According to one exemplary embodiment, pressure-sensor apparatus 101 has a redundant layout of internal bus systems for linking pressure sensors 221, 223. In this context, interface 231 may represent an interface to a first bus, interfaces 233, 237 may represent interfaces to a third bus, and interface 235 may represent an interface to a second bus. Interface 239 may represent an interface to a control unit. Interface 239 may in turn be connected to a separate bus.

First evaluation circuit 225 may take the form of an ASIC, thus, an application-specific integrated circuit of an air-mass measuring apparatus, and second evaluation circuit 227 may be realized as a microcontroller.

The approach described offers a redundant pressure signal. In this context, a flexible, cost-effective integration of two pressure sensors 221, 223 on one evaluation circuit 225, 227 is realized. At the same time, the pressure signal is acquired and processed in respective pressure sensor 221, 223 itself. Pressure sensors 221, 223 are linked to interface controller (microcontroller) 227 via two internal bus systems independent of each other. In addition to providing protection for the failure of one pressure sensor 221, 223, protection is also provided for the failure of one internal bus.

According to one exemplary embodiment (not shown), a redundant pressure signal may be realized very easily by the integration of an additional second pressure sensor 223 on the circuit. In order to be able to transmit the pressure signals via a digital interface 239, e.g., to the control unit, pressure sensors 221, 223 are connected via one common internal bus (e.g., SPI (serial peripheral interface)) to a microcontroller. It collects the instantaneous measured pressure values of the two sensors 221, 223 and transmits them via a digital interface 239 to the control unit. In such a design, the system is laid out redundantly against the failure of one pressure sensor 221, 223.

However, in using such a sensor partitioning, a failure of the internal bus system (e.g., SPI) of microcontroller 227 leads to the loss of both pressure-sensor signals.

To prevent this, the linking of pressure sensors 221, 223 is accomplished via separate internal bus systems, as shown in FIG. 2. One possible coupling is shown in FIG. 2. In that case, one pressure sensor 221 is connected via a first internal bus (e.g., SPI) to evaluation IC 225 of a pressure-measuring apparatus 101 or of an air-mass sensor. Second pressure sensor 223 is connected directly to microcontroller 227 via a second internal bus (e.g., SPI).

According to one exemplary embodiment, second evaluation circuit 227 in the form of a microcontroller and first evaluation circuit 225 in the form of an ASIC communicate via a further third internal bus (e.g., I2C). The data of first pressure sensor 221 is transmitted to microcontroller 227 via this bus. All three bus systems operate independently of each other. In this manner, the redundant layout for the pressure signal continues to be provided even in the event one internal bus system fails. By the coupling to ASIC 225, the objective of the redundant layout for the pressure signal may be achieved inexpensively in terms of a failure of an internal bus system, as well, without the incorporation of a further microcontroller. No additional costs accrue for the exemplary embodiment of an air-mass sensor, since ASIC 225 for ascertaining the air mass is already integrated in known circuits. In addition, a known ASIC has the possibility of linking a pressure-sensor satellite.

Figure 3:
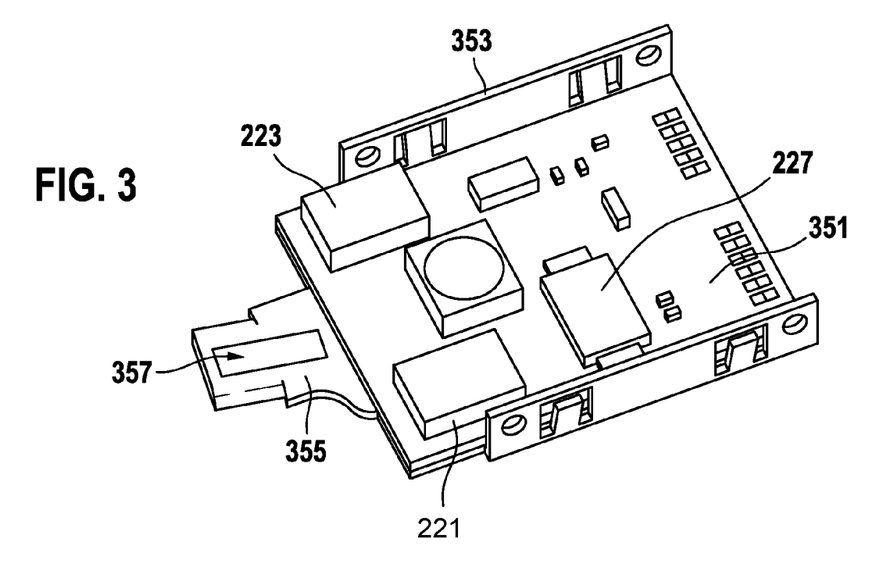
FIG. 3 shows a representation of a pressure-sensor apparatus for an air-mass measuring apparatus.

FIG. 3 shows a representation of a pressure-sensor apparatus for an air-mass measuring apparatus according to one exemplary embodiment of the present invention. It may be a pressure-sensor apparatus as described on the basis of FIG. 2.

The pressure-sensor apparatus has a first pressure sensor 221, a second pressure sensor 223, a first evaluation circuit (not shown in FIG. 3), and a second evaluation circuit 227 in the form of a microcontroller. First pressure sensor 221, second pressure sensor 223 and evaluation circuit 227 are disposed on one side of a circuit carrier 351. For example, the first evaluation circuit may be placed on an opposite side of circuit carrier 351. Signals between pressure sensors 221, 223 and evaluation circuit 227 may be transmitted via printed conductors of circuit carrier 351.

Figure 5:
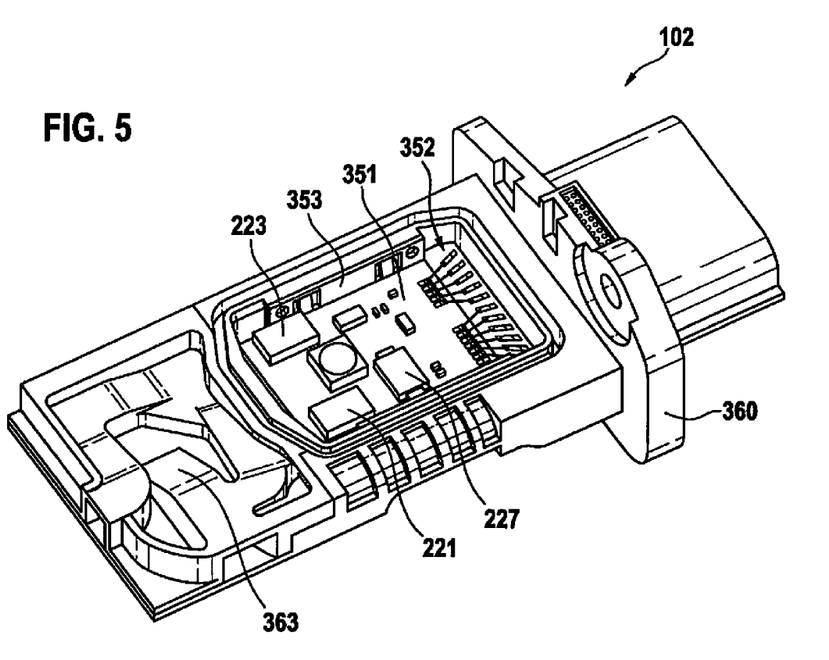
FIG. 5 shows an air-mass measuring apparatus.

Circuit carrier 351 is accommodated by a base plate 353. A side of circuit carrier 351 facing away from sensors 221, 223 and second evaluation circuit 227 lies on a bottom of base plate 353. Base plate 353 has two facing wall sections that are at right angles to the bottom of base plate 353 and run along two opposite edges of circuit carrier 351. The wall sections of base plate 353 have fasteners, e.g., through holes and/or locking hooks for securing base plate 353 to a housing, as shown in FIG. 5, for example.

A sensor carrier 355 protrudes beyond a free end of circuit carrier 351, which is not shielded by any wall section of base plate 353. Sensor carrier 335 is situated approximately centrally with respect to the free end of circuit carrier 351. Sensor carrier 355 is approximately half as wide as circuit carrier 351. Main surfaces of sensor carrier 355 and of circuit carrier 351 are aligned generally parallel to each other. Sensor carrier 355 has an accommodation area 357 for an air-mass sensor 357. Such an air-mass sensor may be connected via suitable lines to electrical contacts of circuit carrier 351.

Besides the elements named, a humidity sensor for detecting a humidity may be disposed on circuit carrier 351, for instance. In addition, a temperature sensor may be connected to circuit carrier 351. Circuit carrier 351 may also include further electronic components such as resistors, for example.

Figure 4:
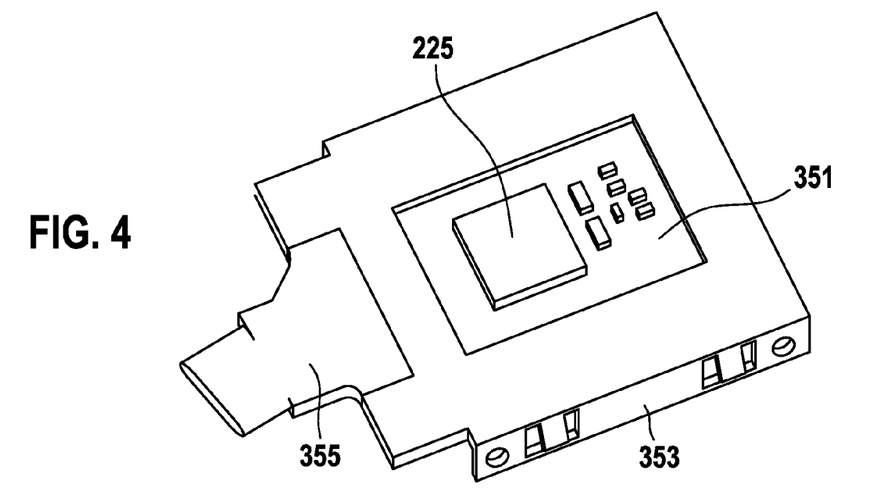
FIG. 4 shows a representation of a pressure-sensor apparatus for an air-mass measuring apparatus.

FIG. 4 shows a representation of a pressure-sensor apparatus for an air-mass measuring apparatus according to one exemplary embodiment of the present invention. It may be the pressure-sensor apparatus shown in FIG. 3, which is shown from the back side in FIG. 4.

The back sides of circuit carrier 351, sensor carrier 355 and base plate 353 are shown, as are already described with the aid of FIG. 3. First evaluation circuit 225 is disposed on the back side of circuit carrier 351. To that end, base plate 353 has a cut-out for the area of circuit carrier 351 in which evaluation circuit 225 is located. First evaluation circuit 225 may be realized as what is referred to as an ASIC.

According to one exemplary embodiment, FIGS. 3 and 4 show a construction of an electronics module that includes populated circuit carrier 351, fitted sensor carrier 355 and base plate 353 joining circuit carrier 351 and sensor carrier 355. The electronics module may be inserted into an electronics compartment of a housing provided for it.

FIG. 5 shows an air-mass measuring apparatus 102 according to one exemplary embodiment of the present invention. Air-mass measuring apparatus 102 is in the form of a plug-in sensor. Air-mass measuring apparatus 102 represents an air-mass sensor having a redundant pressure sensor 221, 223 and a digital interface, e.g., to a control unit.

Air-mass measuring apparatus 102 has a housing 360 having an electronics chamber and a measuring-channel section 363. The electronics chamber is formed to accommodate an electronics module, as shown in FIG. 5. In this context, the electronics module may be made up of base plate 353, the sensor carrier made of plastic and circuit carrier 351.

Measuring-channel section 363 is adjacent to the electronics chamber. A measuring channel 363 is formed by measuring-channel section 363 of housing 360 and by a housing part that is mounted as a measuring-channel (bypass-) cover on measuring-channel section 363 of housing 360. The measuring channel has a multitude of bends to guide a gas through housing 360 of air-mass measuring apparatus 102. Once the electronics module is situated in the electronics chamber, the sensor carrier extends into the measuring channel. In this way, the air-mass sensor disposed on sensor carrier 220 may be in direct contact with gas, e.g., air, conducted through the measuring channel.

The electronics chamber may be covered by a further cover. It may be an electronics-compartment cover.

On a side of the electronics chamber opposite measuring-channel section 363, a plug-connector section is formed from housing 360 as a plug-in-sensor connection of air-mass measuring apparatus 102.

Housing 360 has a conductor comb having a plurality of electrical conductors. Via conductor comb 352, circuit carrier 351 may be connected to an electrical connection of air-mass measuring apparatus 102, the electrical connection being disposed on housing 360.

According to this exemplary embodiment, air-mass measuring apparatus 102 has a further sensor in the form of a thermal detector. For example, the thermal detector may be situated adjacent to circuit carrier 351. Connections of the thermal detector may be contacted via the conductor comb.

In the case of air-mass sensor 102 (integrated pressure- and humidity sensor), in addition to air mass and intake-air temperature, further measured quantities are ascertained, such as pressure, relative humidity and temperature at the humidity sensor. Individual sensors 221, 223 for pressure, as well as the individual sensors for air mass, humidity and temperature operate independently of each other. The respective measured quantities may be transmitted via one common line or several separate lines to a control unit. To that end, for example, air-mass sensor 102 may have a 3-pin or an 8-pin connector.

Housing 360 of air-mass sensor 102 may have two electronics chambers on the front side and back side of circuit carrier 351. The two electronics chambers may be implemented without fluid connection. Different production lines may be used for mounting the components on the front side and back side of circuit carrier 351.

For instance, the air-mass sensor may take the form of a micromechanical sensor.

According to one exemplary embodiment, air-mass measuring apparatus 102 has an LIN interface and possesses an electronics chamber. The electronics chamber is used to accommodate the electronics module, as shown in FIG. 5. The electronics module is made up of base plate 353 with integrally extruded sensor carrier 355, as shown in FIG. 5. Sensor carrier 355 is used to accommodate the air-mass sensor. Populated circuit carrier 351 is mounted on base plate 353. Circuit carrier 351 is connected to the air-mass sensor by fine-wire bonds. All electrical components 221, 223; 225, 227, with the exception of the thermal detector, are mounted and soldered on circuit carrier 351 by a standard SMD process. The fitting is carried out in repeated pattern, that is, on a plurality of circuit carriers 351 simultaneously. Using the SMD assembly process, variants, e.g., with additional redundant pressure sensor 221, 223 and/or humidity sensor, may be embodied relatively easily and cost-effectively.

Pressure sensors 221, 223 and humidity sensors function as independent sensors on circuit carrier 351. That means that measuring and signal conditioning are carried out in respective sensors 221, 223 themselves.

The thermal detector is linked up with microcontroller 225 via the conductor comb and heavy-wire bonds between the conductor comb and circuit carrier 351.

By using a digital interface, a plurality of sensor signals may be transmitted via one signal line to the control unit. To that end, the additional sensors (pressure, ASIC with connected pressure sensor, temperature, humidity) are linked as satellites to microcontroller 227. It collects the measurement data, conditions it and sends it via a digital interface to the control unit.

Figure 6:
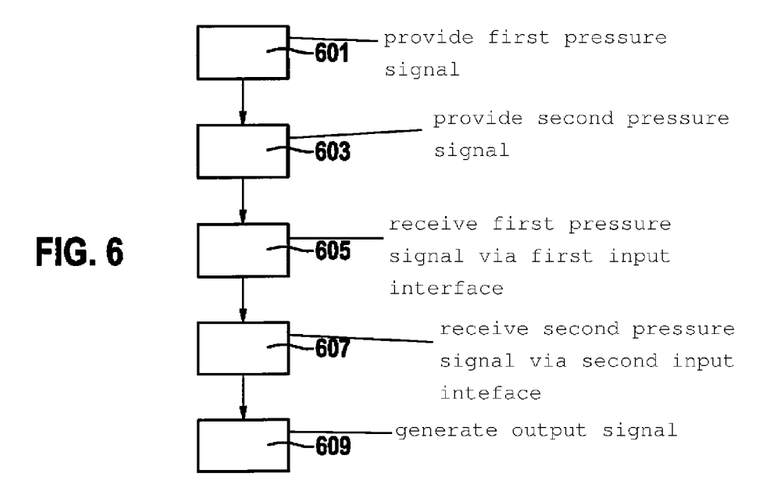
FIG. 6 shows a flowchart of a pressure-measuring method.

FIG. 6 shows a flowchart of a pressure-measuring method according to one exemplary embodiment of the present invention. The steps of the method may be carried out, for example, in conjunction with devices of an apparatus shown in the previous figures.

The method includes a step 601 in which a first pressure signal is provided, and a step 603 in which a second pressure signal is provided. For instance, the pressure signals may be provided by two pressure sensors disposed spatially separate from each other as shown, e.g., in FIG. 2.

In a step 605, the first pressure signal is received via a first input interface, and in a step 607, the second pressure signal is received via a second input interface of an evaluator.

In a step 609, based on the first pressure signal and the second pressure signal, an output signal is generated and output at an output interface.

In an optional step, the evaluator may also receive an air-mass signal from an air-mass sensor. Data of the air-mass signal may be output via a separate output interface or together with data of the pressure signals via the output interface already named.

The exemplary embodiments described and illustrated in the figures are selected only by way of example. Different exemplary embodiments may be combined with each other completely or in terms of individual features. One exemplary embodiment may also be supplemented by features from another exemplary embodiment.

Moreover, method steps according to the present invention may be repeated, as well as executed in a sequence other than that described.

If an exemplary embodiment includes an "and/or" link between a first feature and a second feature, this is to be read in such a way that the exemplary embodiment according to one specific embodiment has both the first feature and the second feature, and according to a further specific embodiment, has either only the first feature or only the second feature.

What is claimed is:

1. A pressure-sensor apparatus for an air-mass measuring apparatus for a vehicle, comprising:

a circuit carrier;
a first pressure sensor disposed on the circuit carrier and configured to sense a pressure and to provide a first pressure signal representing the pressure;
a second pressure sensor disposed on the circuit carrier and configured to sense the pressure and to provide a second pressure signal representing the pressure; and
an evaluator disposed on the circuit carrier, the evaluator having a first input interface to receive the first pressure signal, a second input interface to receive the second pressure signal and an output interface to output an output signal provided using the first pressure signal and the second pressure signal, the evaluator further having an input interface for receiving the air-mass signal;
wherein the air-mass measuring apparatus includes:
an air-mass sensor for providing an air-mass signal;
the pressure-sensor apparatus; and
a sensor carrier on which the air-mass sensor is disposed;
a base element for accommodating the sensor carrier and the circuit carrier; and
a housing having an electronics chamber, a measuring channel for conducting a gas, and an electrical connection, wherein a unit made up of the base element, the sensor carrier and the circuit carrier are disposed in the electronics chamber, the air-mass sensor is inserted into the measuring channel, and the output interface is connected to the electrical connection via electric lines.

2. The pressure-sensor apparatus as recited in claim 1, wherein the first and second input interfaces are each implemented as an interface of a separate data bus.

3. The pressure-sensor apparatus as recited in claim 1, wherein the evaluator includes a first evaluation circuit having the first input interface to receive the first pressure signal and an output interface to output a third pressure signal provided using the first pressure signal, and includes a second evaluation circuit having the second input interface to receive the second pressure signal, a third input interface to receive the third pressure signal and the output interface to output the output signal provided using the second pressure signal and the third pressure signal.

4. The pressure-sensor apparatus as recited in claim 3, wherein the first evaluation circuit is an integrated evaluation circuit, and the second evaluation circuit is an integrated microcontroller circuit.

5. The pressure-sensor apparatus as recited in claim 3, wherein the first evaluation circuit and the second evaluation circuit are disposed on opposite sides of the circuit carrier.

6. The pressure-sensor apparatus as recited in claim 3, wherein the first evaluation circuit has a fourth input interface to receive an air-mass signal provided by an air-mass sensor.

7. An air-mass measuring apparatus for a vehicle, comprising:
an air-mass sensor for providing an air-mass signal;
a pressure-sensor apparatus, including a circuit carrier, a first pressure sensor disposed on the circuit carrier and configured to sense a pressure and to provide a first pressure signal representing the pressure, a second pressure sensor disposed on the circuit carrier and configured to sense the pressure and to provide a second pressure signal representing the pressure, and an evaluator disposed on the circuit carrier, the evaluator having a first input interface to receive the first pressure signal, a second input interface to receive the second pressure signal and an output interface to output an output signal provided using the first pressure signal and the second pressure signal, the evaluator further having an input interface for receiving the air-mass signal; and
a sensor carrier on which the air-mass sensor is disposed;
a base element for accommodating the sensor carrier and the circuit carrier; and
a housing having an electronics chamber, a measuring channel for conducting a gas, and an electrical connection, wherein a unit made up of the base element, the sensor carrier and the circuit carrier are disposed in the electronics chamber, the air-mass sensor is inserted into the measuring channel, and the output interface is connected to the electrical connection via electric lines.

8. The air-mass measuring apparatus as recited in claim 7, further comprising:
at least one of a humidity sensor and a temperature sensor, wherein the evaluator is configured to receive at least one of: a humidity signal from the humidity sensor, and a temperature signal from the temperature sensor.

9. An air-mass measuring system for a vehicle, comprising:
an air-mass measuring apparatus for the vehicle, including:
an air-mass sensor for providing an air-mass signal, and a pressure-sensor apparatus, including: a circuit carrier, a first pressure sensor disposed on the circuit carrier and configured to sense a pressure and to provide a first pressure signal representing the pressure, a second pressure sensor disposed on the circuit carrier and configured to sense the pressure and to provide a second pressure signal representing the pressure, and an evaluator disposed on the circuit carrier, the evaluator having a first input interface to receive the first pressure signal, a second input interface to receive the second pressure signal and an output interface to output an output signal provided using the first pressure signal and the second pressure signal, the evaluator further having an input interface for receiving the air-mass signal, a sensor carrier on which the air-mass sensor is disposed, a base element for accommodating the sensor carrier and the circuit carrier, and a housing that has an electronics chamber, a measuring channel for conducting a gas, and an electrical connection,
wherein a unit made up of the base element, the sensor carrier and the circuit carrier is disposed in the electronics chamber, the air-mass sensor is inserted into the measuring channel, and the output interface is connected to the electrical connection via electric lines;
wherein the air-mass measuring apparatus is in an induction tract of a combustion engine of the vehicle, the air-mass measuring apparatus is connected via the electrical connection to a control unit of the vehicle.

10. A pressure-measuring method for an air-mass measuring apparatus for a vehicle, the method comprising:
providing a first pressure signal which represents a pressure sensed by a first pressure sensor disposed on a circuit carrier;
providing a second pressure signal which represents a pressure sensed by a second pressure sensor disposed on the circuit carrier;
receiving the first pressure signal via a first input interface of an evaluator disposed on the circuit carrier;
receiving the second pressure signal via a second input interface of the evaluator; and outputting an output signal, provided using the first pressure signal and the second pressure signal, at an output interface of the evaluator;
wherein the air-mass measuring apparatus includes:
an air-mass sensor for providing an air-mass signal;
a pressure-sensor apparatus, including the circuit carrier, the first pressure sensor disposed on the circuit carrier, the second pressure sensor disposed on the circuit carrier, and the evaluator disposed on the circuit carrier, the evaluator having the first input interface to receive the first pressure signal, the second input interface to receive the second pressure signal and the output interface to output the output signal, the evaluator further having an input interface for receiving the air-mass signal; and
a sensor carrier on which the air-mass sensor is disposed;
a base element for accommodating the sensor carrier and the circuit carrier; and
a housing having an electronics chamber, a measuring channel for conducting a gas, and an electrical connection, wherein a unit made up of the base element, the sensor carrier and the circuit carrier is disposed in the electronics chamber, the air-mass sensor is inserted into the measuring channel, and the output interface is connected to the electrical connection via electric lines.

* * * * *